Aug. 19, 1947.　　　N. F. ANDREWS　　　2,425,855
SELF-PROPELLED IMPLEMENT
Filed July 16, 1943　　　3 Sheets-Sheet 1

INVENTOR.
NORMAN F. ANDREWS
BY
ATTORNEYS

Aug. 19, 1947.   N. F. ANDREWS   2,425,855
SELF-PROPELLED IMPLEMENT
Filed July 16, 1943   3 Sheets-Sheet 2
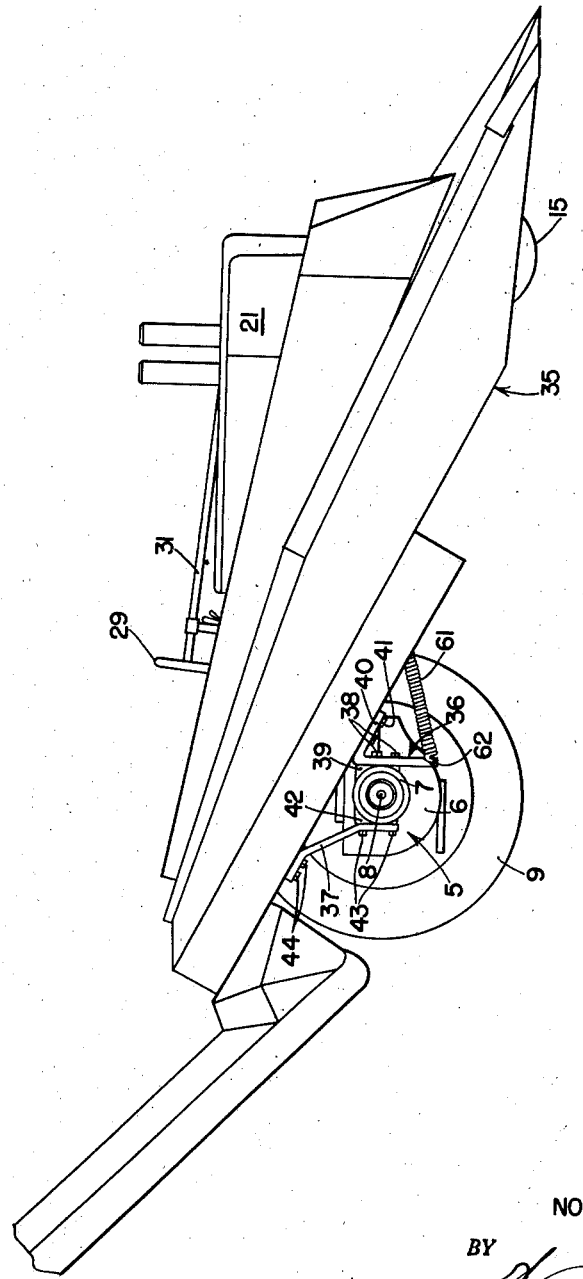
FIG. 2
*INVENTOR.*
NORMAN F. ANDREWS
BY
ATTORNEYS

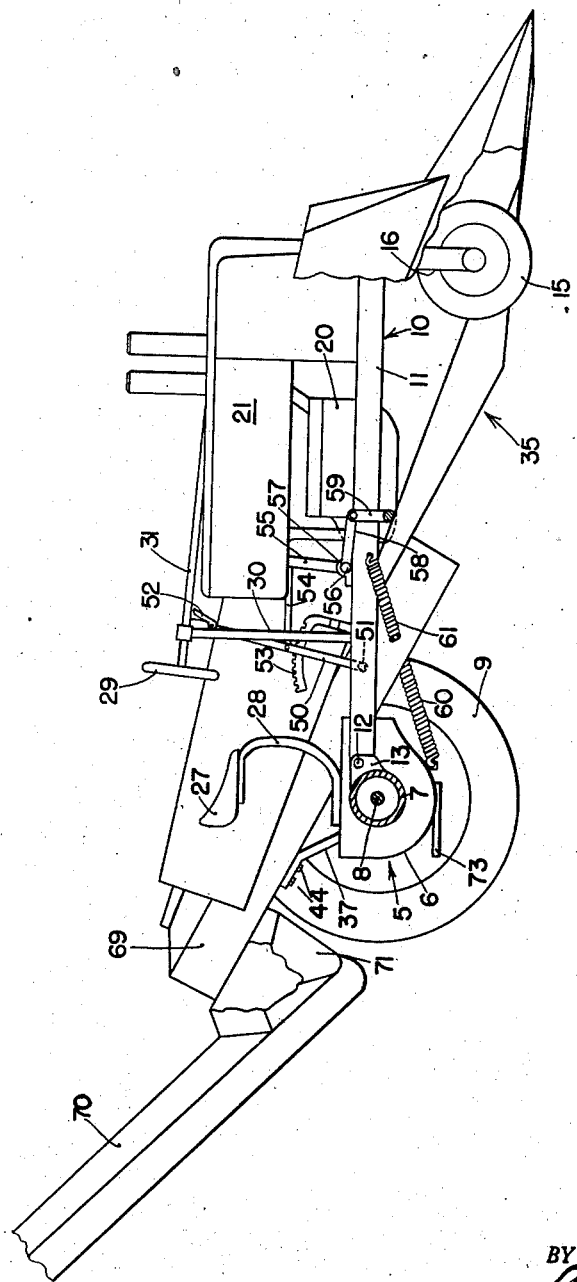

Patented Aug. 19, 1947

2,425,855

UNITED STATES PATENT OFFICE 2,425,855

SELF-PROPELLED IMPLEMENT

Norman F. Andrews, Moline, Ill., assignor to Deere & Company, Moline, Ill., a corporation of Illinois Application July 16, 1943, Serial No. 495,015

2 Claims. (Cl. 56—18)

The present invention relates generally to self-propelled implements and is particularly applicable to corn harvesters, although it is not to be limited to such, and has for its principal object the provision of a lighter and less expensive implement without sacrifice of strength or durability.

Heretofore, certain self-propelled implements, such as corn pickers and the like, have been constructed by mounting an implement frame on a conventional tractor, which of course, is constructed with an exceedingly heavy frame adapted to withstand much more severe service than is encountered in corn harvesting operations and the like. Inasmuch as an implement such as a two-row corn harvester requires a large and sturdy frame construction even though it is to be used merely as an attachment for a tractor, applicant contemplates using the implement frame to provide a substantial portion of the strength of the combined implement, thus making it possible to reduce the size and weight of that portion of the frame which carries the motive power equipment, in designing an implement adapted specifically for one purpose, such as that of a corn harvester.

In the accomplishment of this object, applicant has designed an implement in which the greater part of the strength is provided by the implement frame and the axle housing for the traction wheels, while the motor is supported on a supplemental frame pivotally mounted on the axle housing, but without the excess strength usually required in a tractor which is designed to perform various other purposes.

These and other objects and advantages of my invention will be apparent to those skilled in the art after a consideration of the following description, in which reference is had to the drawings appended hereto, in which Figure 1 is a plan view of a self-propelled corn harvester embodying the principles of my invention.

Figure 2 is a side elevational view of the implement, the near traction wheel being removed to more clearly show the details of construction.

Figure 3 is a sectional elevational view taken along a line 3—3 in Figure 1.

Figure 1:
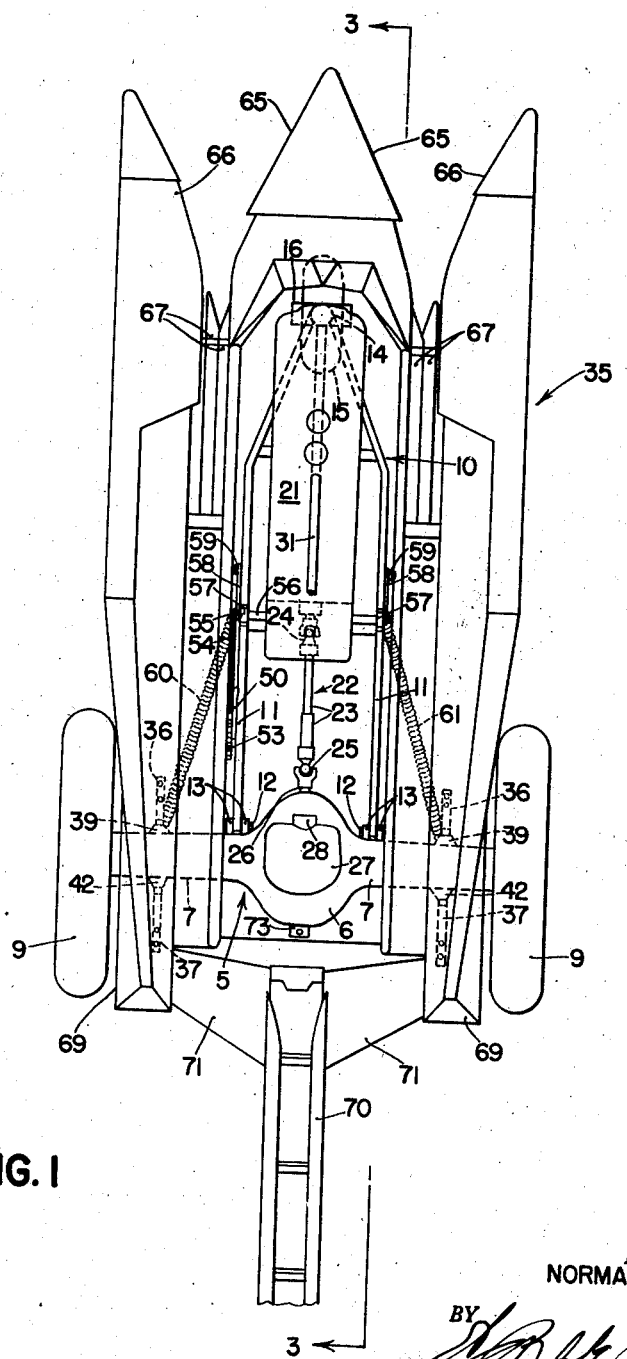

Referring now to the drawings, the implement comprises a transversely disposed axle housing 5, which is strongly built and adapted to support a considerable portion of the weight of the implement frame. The axle housing 5 is of more or less conventional banjo type construction, including a centrally disposed differential housing portion 6 and a pair of oppositely extending housing portions 7 for enclosing and supporting the drive axles 8, the latter extending out of the ends of the housing portions 7 to receive the traction wheels 9, respectively. A motor frame 10 comprises a pair of frame beams 11, pivotally mounted at their rear ends, by means of pivot bolts 12, on lugs 13 integrally formed on the forward side of the axle housing 5 on opposite sides of the differential housing 6. The motor frame beams 11 extend forwardly from the pivot bolts 12 and converge at their forward ends and are connected together at a steering post 14, which is mounted on a dirigible front wheel 15 by means of a suitable fork 16.

A conventional engine, indicated at 20, is mounted on the motor frame 10 between the frame bars 11 and the motor 20 is covered by a hood 21, which houses the fuel tank, radiator, etc., as in a conventional tractor. The motor 20 is connected with the traction wheels 9 by means of flexible power transmitting mechanism, indicated in its entirety by reference numeral 22 and comprising a pair of telescoping shaft sections 23 extending longitudinally between the motor 20 and the differential housing 6 and connected through universal joints 24, 25 to the drive shaft of the motor 20 and to a drive shaft 26 extending into the forward side of the differential housing portion 6. The differential mechanism connecting the shaft 26 with the axles 8 is well-known and need not be shown and described here in detail. A seat 27 is provided for the operator, which is mounted on a standard 28 supported on the top of the differential housing portion 6. The operator controls the machine by means of a steering wheel 29 supported on a post 30 attached to the motor frame 10, the steering wheel being fixed to a steering shaft 31 extending forwardly to operate the front wheel 15.

The implement comprises a generally U-shaped frame or body 35, the two sides of which extend forwardly along opposite sides of the motor frame 10, and around the forward end of the latter. The body 35 is rigidly mounted on the axle housing 6 by means of a pair of brackets 36, 37 disposed beneath each side of the U-shaped frame or body 35. The front brackets 36 are rigidly secured to the front sides of the two axle housing portions 7 by means of bolts 38, which engage suitable tapped recesses in bosses 39, formed integrally with the axle housing portions 7. The bracket 36 is angular in form and has an upper end portion 40 extending forwardly and inclined downwardly beneath the lower side of the associated part of the U-shaped frame 35 and is secured thereto by suitable bolts 41, as best shown in Figure 2. The rear brackets 37 are rigidly fixed to a pair of implement supporting bosses 42, formed integrally with the rear surfaces of the axle housing portions 7 intermediate the length of the latter, and are secured thereto by bolts 43. The brackets 37 extend upwardly and incline rearwardly, and are secured by bolts 44 at the upper ends of the brackets 37, to the lower side of the implement frame. Thus, it is now evident that the U-shaped frame 35 is rigidly mounted on the axle housing 5, so that when the latter is rocked in a counterclockwise direction as viewed in Figures 2 and 3 about the axis of the axles 8, the forward end of the implement frame is raised, and likewise when the axle housing is rocked in a clockwise direction, the forward end of the frame is lowered. During this rocking movement, angular movement takes place between the axle housing 5 and the longitudinal bars 11 of the motor frame 10 about the common transverse axis of the pivot bolts 12.

The axle housing 5 can be rocked relative to the motor frame for the purpose of raising the forward end of the implement frame 35, by means of a manually controlled lever 50, pivotally mounted at 51 on one of the motor frame bars 11. The lever 50 is secured in adjusted position by means of suitable latch mechanism actuated by a hand control 52, for engaging a notched sector 53 fixed to the frame bar 11. The lever 50 is connected through a forwardly extending link 54 to a vertically extending arm 55 fixed to a rockshaft 56. The rockshaft 56 is disposed transversely and is journaled in bearings 57 on the two motor frame beams 11. A pair of forwardly extending arms 58 are fixed to the rockshaft 56 and the forward ends of the arms 58 are connected by a pair of depending links 59 to the two sides of the U-shaped frame 35, respectively. Thus, when the operator pulls the lever 50 rearwardly, the latter acts through the link 54, arm 55, forwardly extending arms 58, and links 59 to raise the forward end of the implement frame and thus rock the axle housing 5 rearwardly about the axis of the wheels 9 whereby angular movement takes place between the axle housing 5 and the motor frame 10. When the forward end of the implement frame reaches the desired elevation, the operator releases the latch control 52, thereby latching the lever 50 to the sector 53. This operation is facilitated by means of a pair of counterbalancing springs 60, 61, which are connected at their forward ends to the side bars 11, respectively, and extend rearwardly and downwardly and are anchored at their rearward ends on the lower ends of the front implement supporting brackets 36, respectively, the latter being extended downwardly below the axle housing 5 to provide a moment arm against which the tension in the springs can act, tending to rock the axle housing 5 in a counterclockwise direction as viewed in Figures 2 and 3.

The implement body 35 includes two pairs of inner and outer gatherers 65, 66, the two inner gatherers 65 being merged at the front of the motor frame in a manner well-known to those skilled in the art. The stalks of corn in two adjacent rows are received between the two pairs of gatherers, respectively, as the implement moves forwardly, and each row of stalks is received between a pair of snapping rolls 67, which snap the ears from the stalks by rotating the snapping rolls to draw the stalks downwardly therebetween. The snapped ears are conveyed rearwardly to a pair of longitudinally extending husking boxes 69 by suitable conveying means (not shown) and after the ears are husked in the usual manner, they are delivered to a rearwardly extending wagon elevator 70 through a pair of inwardly and downwardly extending troughs or chutes 71 at the rear of the axle housing 5. The wagon elevator 70 delivers the ears to a wagon (not shown) which is drawn behind the implement, a suitable drawbar 73 being attached to the underside of the differential housing portion 6, to which the wagon tongue can be coupled. The details of the mechanism in the corn harvester for conveying, husking and cleaning the ears of corn are not important per se in the understanding of this invention.

It will be understood from the above that the unitary rigid structure comprising the axle housing 5 and the U-shaped implement frame 35 is sufficiently strong and rigid in itself to permit the motor frame 10 to be constructed considerably lighter than the usual tractor frame, with a corresponding saving in cost.

I claim:

1. A self propelled harvester comprising a transversely disposed axle housing mounted on a pair of wheels at opposite ends thereof, respectively, said housing including a differential housing portion intermediate the ends thereof and a shaft projecting from said housing portion for driving said wheels, a motor frame having one end pivotally connected to said housing by means providing for rocking movement about a transverse axis spaced from the axis of rotation of said wheels, wheel means for supporting the other end of said frame, a motor mounted on said motor frame and having a drive shaft, a power transmitting shaft interconnecting said drive shaft with said differential housing shaft, said power transmitting shaft having an extensible portion and a pair of universal joints providing for rocking movement of said axle housing relative to said motor frame, and means for adjustably rocking said housing relative to said motor frame and for securing said housing rigidly to said frame in adjusted position.

2. A self propelled harvester comprising a transversely disposed axle housing mounted on a pair of wheels at opposite ends thereof, respectively, said housing including a differential housing portion intermediate the ends thereof and a shaft projecting forwardly from said housing portion for driving said wheels, a motor frame ahead of said housing and having its rear end pivotally connected to said housing providing for rocking movement about a transverse axis spaced from the axis of rotation of said wheels, wheel means for supporting the front end of said frame, a motor mounted on said motor frame and having a drive shaft, a power transmitting shaft interconnecting said drive shaft with said differential housing shaft, said power transmitting shaft having an extensible portion and a pair of universal joints providing for rocking movement of said axle housing relative to said motor frame, and means for adjustably rocking said housing relative to said motor frame and for securing said housing rigidly to said frame in adjusted position.

NORMAN F. ANDREWS.

REFERENCES CITED

The following references are of record in the file of this patent:

UNITED STATES PATENTS

| Number | Name | Date |
|---|---|---|
| 2,255,168 | Hyman et al. | Sept. 9, 1941 |
| 2,287,379 | Kiehl | June 23, 1942 |
| 2,320,135 | Hyman | May 25, 1943 |
| 1,121,740 | Markham | Dec. 22, 1914 |
| Re. 16,378 | MacGregor | July 6, 1926 |
| 1,179,902 | Davis | Apr. 18, 1916 |
| 2,139,165 | Kuhlman | Dec. 6, 1938 |